Jan. 5, 1960 K. T. SORENSEN 2,919,871
AIRCRAFT RUNWAY BARRIERS
Filed Nov. 15, 1956 3 Sheets-Sheet 1
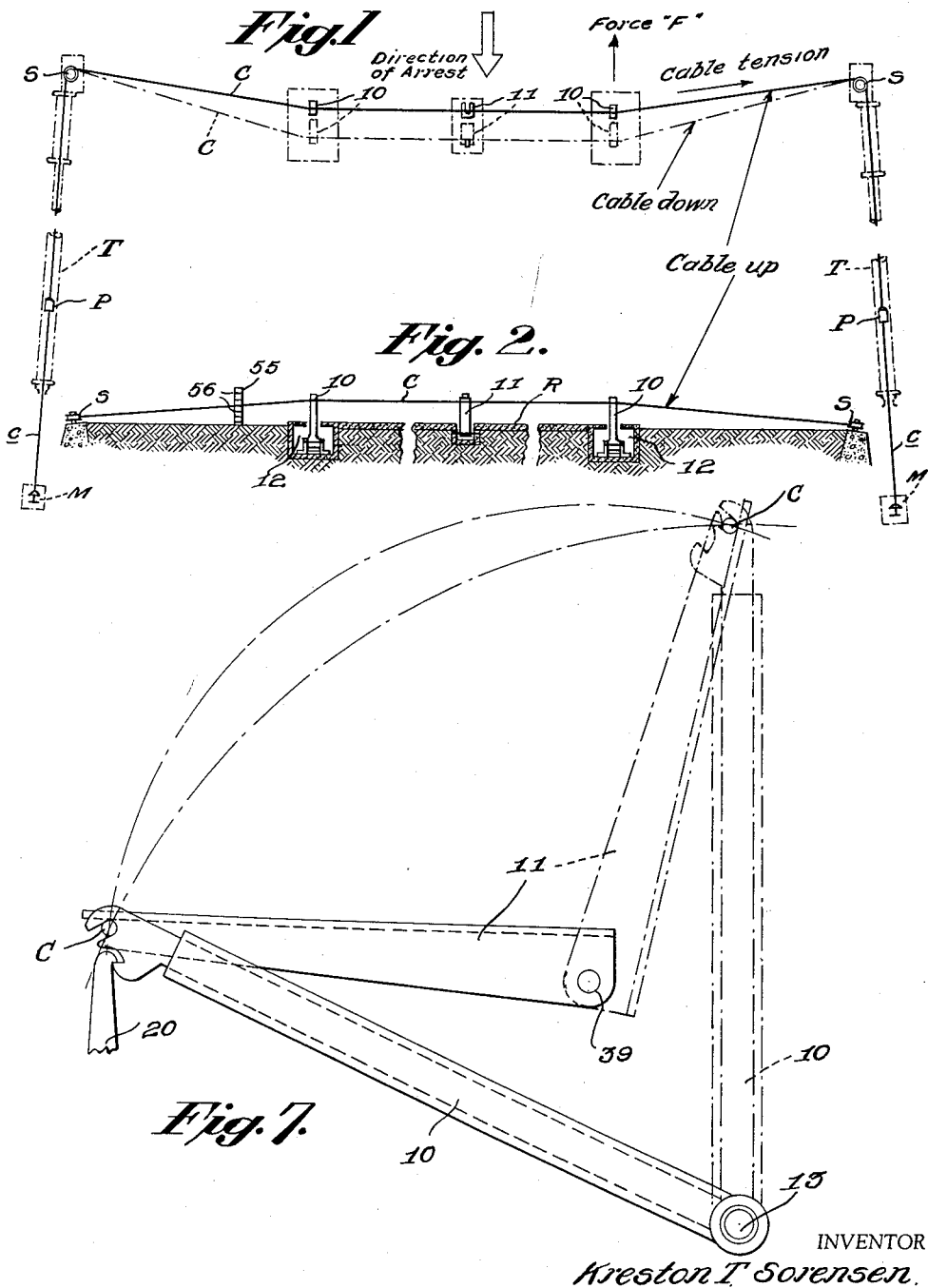
INVENTOR
Kreston T. Sorensen.
BY Herbert M. Birch
ATTORNEY Jan. 5, 1960  K. T. SORENSEN  2,919,871
AIRCRAFT RUNWAY BARRIERS
Filed Nov. 15, 1956  3 Sheets-Sheet 2

INVENTOR
Kresten T. Sorensen.
BY Herbert M. Birch
ATTORNEY

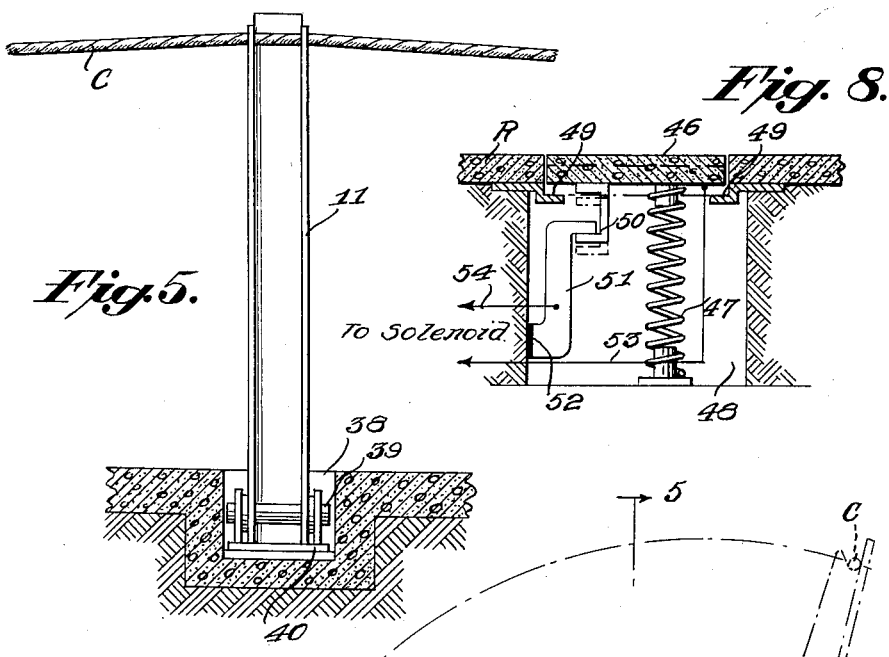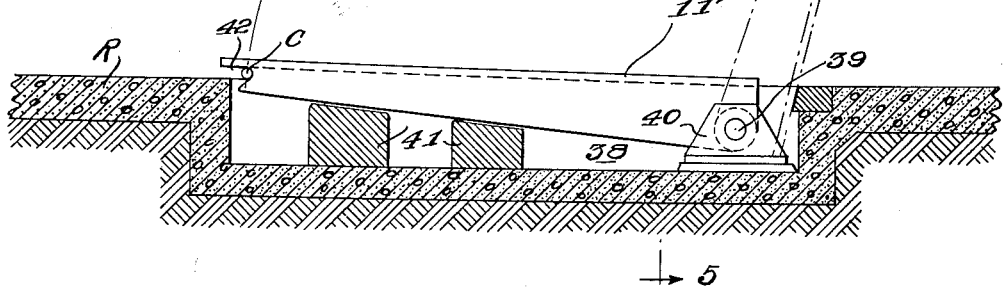

United States Patent Office 2,919,871
Patented Jan. 5, 1960

1

2,919,871

AIRCRAFT RUNWAY BARRIERS

Kresten T. Sorensen, Media, Pa., assignor to All American Engineering Company, Wilmington, Del., a corporation of Delaware Application November 15, 1956, Serial No. 622,450

11 Claims. (Cl. 244—110)

This invention relates to an aircraft runway barrier.

The invention is more particularly concerned with an aircraft barrier, which embodies a cable disposed transversely of a runway and normally resting thereon and which is adapted to be popped-up for engagement of an aircraft landing gear therewith for arresting or decelerating the aircraft through arresting means engaged with opposite ends of the cable, in a heretofore known manner. For example, such arresting means are illustrated and described in Patent No. 2,731,219, issued January 17, 1956.

In barriers of the above noted general character as heretofore provided, the cable is popped-up by means of pneumatic or hydraulic cylinders, explosives, springs, or rubber bungee cords. It is accordingly a primary object of this invention to provide an aircraft runway barrier, which embodies a pre-tensioned cable having its ends attached to arresting means, together with normally inoperative means engaged with the cable for elevating the same above the runway under tension on the cable upon rendering said means operative.

A further object of the invention is the provision of an aircraft runway barrier as above referred to, wherein said means embody stanchions having corresponding ends thereof pivotally supported on the runway and the opposite ends thereof being provided with cable receiving recesses.

A still further object of the invention is the provision of an aircraft runway barrier of the above noted character, wherein power actuated latches are provided for normally retaining the said stanchions in inoperative position with the pre-tensioned cable lying prone across the runway.

A still further object of the invention is the provision of a barrier of the above noted character, wherein power means are provided for moving the stanchions from elevated operative position to lowered inoperative position.

Other objects and advantages of the invention will become apparent in the course of the following detailed description, taken in connection with the accompanying drawings wherein:

Figure 1 is a diagrammatic plan view, wherein the cable traversing the runway is shown in elevated operative arresting position in solid lines and in prone or inoperative runway engaging position in dot-and-dash lines.

Figure 2 is a broken transverse sectional view of a runway showing the cable disposed in operative aircraft arresting position by novel means embodied in the present invention.

Figure 5 is a vertical sectional view showing the intermediate stanchion in operative position, the section being taken on line 5—5 in Figure 6.

Figure 6 is a vertical sectional view at right angles to Figure 5 with the intermediate stanchion shown in lowered inoperative position in solid lines and in raised operative position in dot-and-dash lines.

Fig. 7 is a view of one outboard or end stanchion and the intermediate stanchion in side elevation, the stanchions being shown in full lines in their lowered or inoperative positions and in dot-and-dash lines in their raised or operative positions.

Figure 8 is a vertical sectional view showing a portion of a runway having a latch operating treadle disposed therein.

Figures 3, 4:
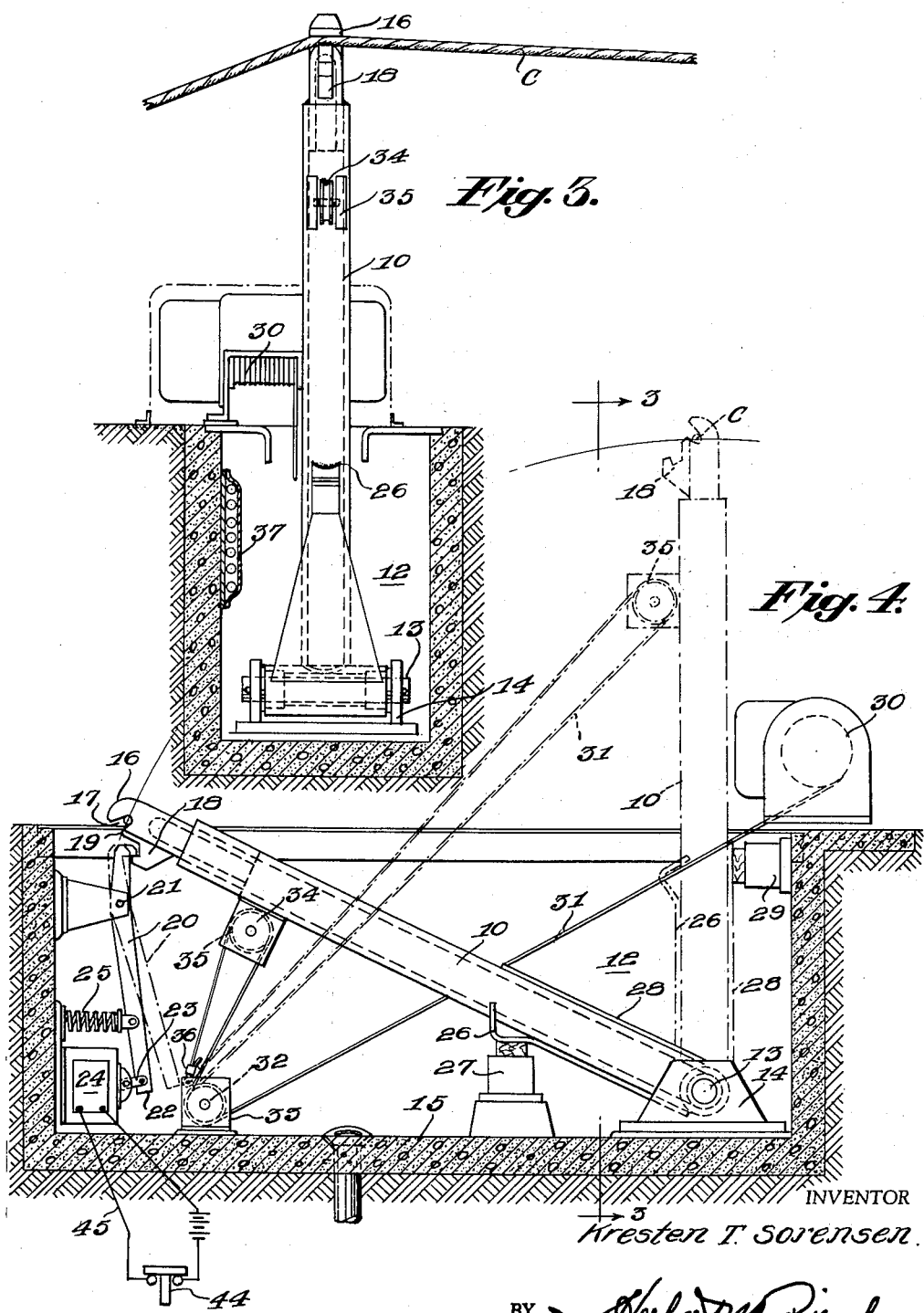
Figure 3 is a vertical sectional view as observed in the plane of line 3—3 on Figure 4 with the end stanchion shown in solid lines.
Figure 4 is a vertical sectional view showing the end stanchion structure in side elevation with the stanchion shown in inoperative position in solid lines and in operative position in dot-and-dash lines.

Referring now in detail to the drawings; and first to Figures 1 and 2 thereof, an arresting cable C is disposed transversely of an aircraft runway R and such cable at opposite sides of the runway is trained around sheaves S and the opposite end portions of the cable extend into arresting tubes T, which as disclosed in the Patent 2,731,-219, issued January 17, 1956, is provided with a fluid for resisting movement of the pistons P therein to which the ends of cable C are secured.

Also as disclosed in co-pending application Serial No. 508,045, now Patent No. 2,777,653, of Donald B. Doolittle, and assigned to the present assignee, retrieving cables C have corresponding ends thereof secured to the arrest pistons and the opposite ends thereof are secured to the retrieving means M, whereby the cable C is capable of being retrieved to its normal position after an aircraft arresting operation.

The structure so far described is known, but in accordance with the present invention, the cable C in its normal inoperative down or prone position is pre-tensioned to the extent of approximately 12,000 pounds. This may be done by the retrieve means.

The essential feature of the present invention is the provision of cable engaging means for the utilization of the tension in the cable to move the same from an inoperative prone or runway engaging position to an elevated aircraft landing gear or arrest hook engaging position.

Such means comprises a pair of outboard stanchions 10 and one or more intermediate stanchions 11.

As is indicated in Figure 3 and 4, each outboard stanchion 10 is normally disposed in a pit 12 at one side of the runway R. The stanchions 10 may comprise a length of pipe whose one end is pivotally connected as at 13 to a suitable support 14 disposed on the floor 15 of the pit adjacent one end thereof. At this point it is to be observed from Figures 3 and 4 that the pit is elongated transversely of the cable C for reasons as will later appear. Each stanchion 10 is provided with a nose 16 having a recess 17 in which the tensioned cable C is seated both in the inoperative and operative positions of the stanchions, the cable C resting on the runway R when the stanchions 10 are in their lowered inoperative positions as is clearly indicated in Figure 4.

Each stanchion 10 is further provided with a hook 18 adjacent its free end and adjacent the nose 16. The hook 18 provides an outwardly opening recess 19 in which is normally disposed one end of a latch 20, which between its ends is pivotally connected as at 21 to a suitable support disposed on an end wall of the pit 12.

The lower end 22 of the latch 20 has a link connection 23 with a solenoid 24, which when energized in the electric circuit disclosed normally holds the latch 20 in the solid line position of Figure 4, wherein the stanchions 10 are retained in normal inoperative position against the yieldable urge of the tensioned cable C.

A coil compression spring 25 reacts against the end wall of the pit 12 and the latch 20 in opposition to the solenoid 24 for a purpose later to appear.

The outboard stanchions 10 are movable to the dot-and-dash line position in Figure 4 for disposing the cable C in the path of the rear landing gear or arrest hook of an aircraft.

Each stanchion 10 is preferably provided with a seat member 26, which in the inoperative position of the stanchion engages a buffer stop 27 and the stanchion is further provided with a seat member 28, which in the raised operative postion thereof engages a buffer stop 29 supported by the opposite end wall of the pit 12.

The latch 20 upon breaking the circuit in the solenoid 24 will be urged by spring 25 to the dot-and-dash line position, whereupon the stanchion 10 will be free and through the tension in cable C the stanchion will be pivoted to the dot-and-dash line position, whereby the cable C will be positioned above the runway intermediate the two outboard stanchions 10.

Should it be desired to lower the barrier without releasing the cable tension, an electric winch 30 may be supported on the edge of pit 12 adjacent said last end wall thereof. This winch is provided with a wound length of cable 31, which extends about a pulley 32 pivotally supported in a housing 33 on the base of pit 12, the cable further extending about a second pulley 34 pivotally supported in a housing 35 supported by the stanchion 10 adjacent its free end, the free end of the cable 31 being secured to housing 33 as indicated at 36.

The cable 31 will assume the dotted line position in Figure 4 upon upward movement of the stanchions 10 under the tension forces of cable C.

As is indicated in Figure 3 a suitable electric heater 37 may be disposed in pits 12 for cold weather operation.

The intermediate stanchion 11 is shown in detail in Figures 5 and 6 and the same is of generally U-form in cross section and is normally disposed in a pit 38 in the runway, the pit being only slightly wider than the stanchion and of substantially the same length, whereby the runway will not be materially interrupted when the structure is not in use.

The stanchion 11 is pivoted at one end thereof as at 39 to a suitable support 40 on the bottom wall of pit 38, and adjacent one end thereof. The stanchion normally rests upon a pair of buffer stops 41 and the free end thereof is provided with a recess 42 for receiving the cable C.

In operation of the improved structure as above described, it is necessary only to release the latch 20 for each outboard stanchion 10, the intermediate stanchion 11 functioning only to support the cable C intermediate the stanchions 10.

The latches 20 may be controlled by various means. Thus as indicated in Figure 4 a tower control button 44 may be actuated to break the circuit 45 to solenoid 24, whereupon spring 25 will disengage the latch with an attendant upward movement of the stanchions 10 and 11 under action of the tension in cable C.

Since it is sometimes desirable to actuate the latches by means of the forward landing gear, whereby rear landing gear arrest hook or the like will engage the arresting cable C, the runway R may be provided with a treadle 46, which is normally level with the runway and which is depressible against the action of one or more springs 47 disposed within a pit 48. The treadle 46 is limited in its downward movement by means of stops 49 and a U-member 50 has one leg thereof secured to the treadle and the other leg thereof normally engaged with a member 51. Through the action of the spring 47 and the member 51, which is insulated as at 52, the circuit is completed to solenoid 24 by leads 53 and 54. This circuit will be broken upon downward movement of the treadle 46 as is indicated by the dotted lines. In fact the latch may be manually operated as by means of a hand lanyard, if desired.

When the cable C has assumed its raised operative or arrest position the rear landing gear of an aircraft approaching in the direction of the arrow in Figure 1 in opposition to force F will move the arresting cable out of the stanchion recesses 17 and 42 and the arresting action on the aircraft will be provided by the pistons P in the tubes T. A tension indicator or marker 55 is preferably provided and the same has vertically spaced horizontal lines 56 as indicated in Figure 2 for visual indication of the amount of tension in the cable.

As is more particularly indicated in Fig. 7, the intermediate stanchion or stanchions are shorter than the end or outboard stanchions 10 and their pivotal connections 39 are in a line laterally displaced from the line of the pivotal connections 13 of the outboard or end stanchions 10. This difference in length results from the fact that the intermediate stanchions 11, which are used as supports only, and not cable elevating means, are supported in relatively shallow pits as shown in Fig. 6, while the end cable elevating stanchions 10 require relatively deep pits as shown in Fig. 3 for the accommodation of the operating mechanisms therefor.

While as is indicated in Fig. 7 the cable engaging ends of the end and intermediate stanchions 10 and 11 move in spaced arcs between their inoperative and operative positions, they are substantially aligned in such positions as is indicated in Fig. 1.

What is claimed and desired to be secured by U.S. Letters Patent is:

1. An aircraft barrier comprising an arresting cable disposed transversely of a runway and trained around sheaves at opposite sides of the runway, means connected to each end of said cable to hold the same under tension, vertically swingable means engaged with the cable intermediate said sheaves and normally deflecting the cable relative to a line connecting said sheaves, means normally holding said swingable means in a lowered inoperative position with the tensioned cable resting on the runway, and means for releasing said holding means for upward swinging movement of said pivoted means under tension in said cable.

2. An aircraft barrier comprising a cable extending across a runway and over a sheave at each side thereof, means connected to each end of the cable to tension the same, a pivoted member having a free end engaged with said cable and normally deflecting same to one side of a straight line connecting said sheaves, means normally retaining said pivoted member with the cable engaged with the runway and means operative to release said pivoted member for upward swinging movement of the free end thereof under the reacting force of said tensioned cable into an aircraft landing gear engaging position of the cable.

3. An aircraft barrier comprising a cable extending transversely of a runway, over a sheave at each side of the runway and having its opposite end portions disposed in arresting tubes at opposite sides of the runway, normally inoperative stanchion means engaged with said cable adapted to raise the same, and means connected to each end of the cable for holding the cable under tension on said runway, said stanchions being raised under the reacting force of said tensioned cable above the runway for engagement of an aircraft landing gear therewith.

4. An aircraft barrier comprising a pair of laterally spaced stanchions having corresponding ends thereof pivoted beneath a runway, said stanchions being normally disposed generally longitudinally of said runway but at an angle thereto, the opposite free ends of said stanchions each having an outwardly opening recess, an arresting cable loop transverse said runway, a retrieve means connected to each end of said cable loop, said cable loop extending transversely of the runway normally engaged within said recesses in contact with the surface of said runway and having a reacting force on said stanchions when the free ends of said loop are pulled by said retrieve means to hold the loop of cable under tension, latch means normally engaged with said stanchions for holding same against pivotal movement, and means operative to release said latches with a resulting upward arcuate swinging action of said stanchions under said force and with the engaged cable disposed above the runway in aircraft landing gear engaging position.

5. An aircraft barrier according to claim 4 together with an intermediate stanchion having one end thereof pivoted beneath said runway and the opposite free end thereof having a cable receiving recess.

6. An aircraft barrier according to claim 5, wherein said first stanchions are each disposed in pits on each side of the runway and said intermediate stanchion being disposed in a pit in the runway intermediate said first pits.

7. An aircraft barrier comprising a stanchion normally disposed in a pit at each side of a runway and having one end pivotally supported at the base of the pit, an intermediate stanchion normally disposed in a pit in the runway and having one end thereof pivotally supported at the base of the pit, the free ends of said first and second stanchions each having a recess, normally disposed at the level of said runway, an arresting cable extending transversely of the runway between sheaves at opposite sides of the runway, a cable tension means connected to each end of the cable, said cable being normally disposed in said recesses in a deflected position relative to a straight line connecting said sheaves, the tensioned runway traversing cable having a reacting force on said stanchions for swinging same upwardly about their pivots, latches normally retaining the first stanchions in their lowered inoperative positions, and means operative to release the latches with a resulting upward swinging movement of the stanchions with the cable disposed in aircraft landing gear engaging position.

8. The structure according to claim 7, wherein said latches are normally engaged with said first stanchions by means of solenoids, spring means acting on said latches in opposition to said solenoids, and switch means for de-energizing the circuits to said solenoids, whereby the latches are retracted by said spring means.

9. The structure according to claim 8, wherein said switch means comprises an aircraft nose wheel engageable treadle in the runway, and circuit making and breaking means operatively connected with the treadle and having circuit connections with said solenoids.

10. The structure according to claim 7, together with a power winch operative for lowering said first stanchions.

11. The structure according to claim 7, together with buffers disposed in said pits for arresting downward pivotal movement of said stanchions after removal of the cable therefrom in an arresting operation on an aircraft.

References Cited in the file of this patent

UNITED STATES PATENTS

| | | |
|---|---|---|
| 1,789,653 | Hoyt | Jan. 20, 1931 |
| 2,712,912 | Hattan | July 12, 1955 |
| 2,731,219 | Cotton et al. | Jan. 17, 1956 |
| 2,783,957 | O'Neil et al. | Mar. 5, 1957 |